(12) United States Patent
Sagel

(10) Patent No.: US 10,400,748 B2
(45) Date of Patent: Sep. 3, 2019

(54) WIND TURBINE WITH FOLDING BLADES

(71) Applicant: Roberto S. Sagel, Tulsa, OK (US)

(72) Inventor: Roberto S. Sagel, Tulsa, OK (US)

( * ) Notice: Subject to any disclaimer, the term of this patent is extended or adjusted under 35 U.S.C. 154(b) by 0 days.

(21) Appl. No.: 15/846,956

(22) Filed: Dec. 19, 2017

(65) Prior Publication Data
US 2018/0171971 A1    Jun. 21, 2018

Related U.S. Application Data

(60) Provisional application No. 62/436,051, filed on Dec. 19, 2016.

(51) Int. Cl.
| | |
|---|---|
| *F03D 3/06* | (2006.01) |
| *F03D 3/00* | (2006.01) |
| *F03D 3/02* | (2006.01) |
| *F03D 7/06* | (2006.01) |
| *F03D 9/25* | (2016.01) |

(52) U.S. Cl.
CPC .............. *F03D 3/067* (2013.01); *F03D 3/005* (2013.01); *F03D 3/02* (2013.01); *F03D 7/06* (2013.01); *F03D 9/25* (2016.05); *F05B 2240/211* (2013.01); *F05B 2260/96* (2013.01); *Y02E 10/74* (2013.01)

(58) Field of Classification Search
CPC .......... F03D 3/067; F03D 3/068; F03D 3/005; F03D 3/02; F03D 9/25; F03D 7/06; F03D 3/06; F05B 2260/96; F05B 2260/72; F05B 2240/211; F05B 2240/312; Y02E 10/74
See application file for complete search history.

(56) References Cited

U.S. PATENT DOCUMENTS

| | | | | |
|---|---|---|---|---|
| 1,296,082 | A * | 3/1919 | Huber .................... | F03D 3/068 416/117 |
| 4,377,372 | A * | 3/1983 | Stutzman ................ | F03D 3/067 416/117 |
| 5,083,902 | A * | 1/1992 | Rhodes ................... | F03D 3/067 416/117 |
| 5,844,323 | A * | 12/1998 | Hung .................... | F03B 17/067 290/54 |
| 6,682,302 | B2 * | 1/2004 | Noble .................... | F03D 3/068 415/4.2 |

(Continued)

FOREIGN PATENT DOCUMENTS

KR          100966523 B1 *  6/2010

*Primary Examiner* — Jason D Shanske
*Assistant Examiner* — Joshua R Beebe
(74) *Attorney, Agent, or Firm* — Dale J. Ream

(57) ABSTRACT

A wind driven turbine is capable of generating electricity in a wide range of wind speeds and in any wind direction. The turbine employs sets of vertical blades that rotate a vertical drive shaft which in turn attaches on its lower end to an electricity generator. Each set of vertical blades is pivotally attached to a central support member so that the blades pivot toward each other to a closed position when rotating into the wind to provide less surface area for the wind to exert force against. Blades of each set of vertical blades also pivot away from each other when rotating away from the wind to provide more surface area for the wind to exert force against. The force of the wind on the blades causes them to pivot open and closed and to cause the drive shaft to rotate.

16 Claims, 10 Drawing Sheets

(56) References Cited

U.S. PATENT DOCUMENTS

| | | | | |
|---|---|---|---|---|
| 7,467,923 | B2* | 12/2008 | Rains | F03B 13/183 |
| | | | | 415/4.2 |
| 8,282,350 | B2* | 10/2012 | Corrado | F03D 3/067 |
| | | | | 290/44 |
| 8,740,564 | B2* | 6/2014 | Kikuchi | F03D 3/067 |
| | | | | 416/119 |
| 2011/0091322 | A1* | 4/2011 | Deeley | F03D 3/068 |
| | | | | 416/98 |
| 2013/0039761 | A1* | 2/2013 | Dulcetti Filho | F03D 3/02 |
| | | | | 416/3 |
| 2015/0091303 | A1* | 4/2015 | Lee | F03D 3/005 |
| | | | | 290/53 |
| 2018/0216638 | A1* | 8/2018 | Baba | F03D 7/04 |

* cited by examiner

WIND TURBINE WITH FOLDING BLADES

REFERENCE TO RELATED APPLICATIONS

This application claims the benefit of provisional patent application U.S. Ser. No. 62/436,051 filed Dec. 19, 2016 titled Wind Turbine and which is incorporated herein by reference.

BACKGROUND OF THE INVENTION

Field of the Invention

This invention is related to a wind driven turbine that is capable of generating electricity in a wide range of wind speeds and in any wind direction. The turbine employs vertical blades that rotate a vertical shaft which attaches on its lower end to a generator.

Description of the Related Art

Wind turbines currently employed in wind farms have huge blades that rotate in a plane that is perpendicular to the ground. Those blades are attached to a horizontal shaft that connects to a generator that is contained within in a housing located on top of a tall vertical support structure. The blades are oriented like the blades of a propeller of an airplane and the drive shaft can be pivoted so that the blades face into the wind to allow the wind turbine to operate with maximum efficiency.

One disadvantage with this arrangement is that the tower must be of considerable height to allow the blades to rotate without striking the ground. Another disadvantage with this arrangement is that the generator is located high in the air which makes installation and servicing of the equipment difficult and expensive. A further disadvantage with this arrangement is that the drive shaft must be pivoted to allow the blades to face in the direction of the wind for the turbine to function properly. Pivoting of the drive shaft also requires the generator to be pivoted in conjunction with the drive shaft. All of this pivoting movement causes accelerated wear which leads to increased maintenance of the equipment. A further disadvantage with this arrangement is that the units cannot be operated safely in high wind situations.

The present invention overcomes these disadvantages by providing a wind turbine that can be constructed without the need for a tall support tower since the blades of the present invention are mounted vertically on the drive shaft.

As the blades of the present invention begin to rotate in the opposite direction from the wind direction, the wind exerts force on the blades causing them to move to their open position. The wind continues to exert force on the open blades as the blades rotate in the opposite direction from the wind direction. When the blades rotate so that they are moving in the same direction as the wind direction, the force of the wind causes the blades to pivot together to a closed position where the force of the wind on the leading edges of the blades is minimized. This ability of the sets of vertical blades to independently pivot between open and closed positions allows the present invention to operate properly and efficiently regardless of the wind direction.

Also, because the drive shaft is mounted vertically, this allows the generator to be located on the ground where it is much easier and less expensive to install and to service. The present invention can be safely operated in a wide range of wind speeds, from very low wind up to approximately 100 mile per hour winds.

SUMMARY OF THE INVENTION

A wind turbine according to the present invention includes six sets of two blades per each set and the blades are vertically mounted in a tier of two stacks or carousels that attach to a central rotating drive shaft. The top carousel consists of, three sets of two blades per each set, and the bottom carousel consists of three sets of two blades per each set. The sets of blades in the top carousel are spaced apart at 120 degrees from each other, and the sets of blades in the bottom carousel are spaced apart at 120 degrees from each other. The set of blades in the top carousel are offset vertically from the sets of blades in the bottom carousel by 60 degrees.

Each set of two blades may be referred to as a blade assembly. Preferably, the present invention includes first, second, and third top blade assemblies situated in the top carousel and first, second, and third bottom blade assemblies situated in the bottom carousel, each blade assembly having a pair of blades pivotally movable between opened and closed configurations.

More particularly the two blades of each set are pivotally mounted so that they are capable of moving from a fully open position where the two blades are located in a single vertical plane to a fully closed position where the two blades are located in parallel vertical planes that are 90 degrees rotated from the plane of the full closed position. Each set of blades is moved between open and closed positions by a bell crank that is actuated by respective blades in response to the wind direction and the wind's force on the blades. In order for the blades in each set to pivot toward each other, they are pivotally mounted to a respective support shaft and framework that is operatively coupled to the drive shaft and extends vertically between the two blades of each set.

The width of the blades is variable, but the width of the innermost blade of the two blades in each set of blades is wider by approximately 20% than its associated outboard blade. The vertical height of the blades can vary, but the vertical height of each pair of blades will be the same and the vertical height of each of the three pairs of blades on a given level or horizontal carousel of the device will be the same.

The drive shaft is mounted in bearings supported by a tower assembly and supporting ground housing so that the vertical drive shaft is able to rotate freely. The drive shaft is rotated by the force of wind on the blades and the rotation of the drive shaft powers a generator that produces electricity. The generator is located at ground level so that the majority of maintenance for the device is at ground level.

The unique thing about the present invention is that each set of two blades alternately opens and closes independently in response to the relative location of the blades with respect to the wind direction as the blades rotate with the drive shaft. The wind provides the force to open and close the sets of blades.

Each set of two blades opens so that the blades lie in a single plane that is perpendicular to the wind as that set of blades rotates in the direction opposite the direction from which the wind is blowing. In this open perpendicular configuration, the wind exerts force on the blades which causes them to be rotated away from the wind direction. Rotation of the blades also rotates the drive shaft to which they are attached.

As each set of two blades rotates so that the wind direction is against the backs of the blades as the blades they rotate in the direction from which the wind is blowing, the wind causes the blades to close or pivot toward each other. When the blades are fully closed, the blades lie in parallel planes with each other and those parallel planes are also parallel with the wind direction. In this closed parallel configuration, the wind does not exert significant force on the blades.

Because the wind exerts considerable force on the blades as the blades rotate away from the wind direction and exerts very little force on the blades as the blades rotate toward the wind direction, the net result is that the wind rotates the blades and the attached drive shaft to generate electricity regardless of the direction from which the wind is originating.

The invention is provided with an air pressure tube technology system that is a shock absorbing system that dampens the shock as the sets of blades open and close as each of the carousels of three sets of blades rotate in conjunction with the drive shaft.

The present invention is designed to normally operate at wind speeds of up to 50 miles per hour. The device has an automatic self-protection feature that shuts the device off at wind speeds of 50 miles per hour. This first shut off feature can be overridden by the operator, and the invention will automatically shut off via a second shut off feature when wind speeds of 75 miles per hour are detected. This second shut off feature can also be overridden by the operator, and the invention will then automatically shut off via a third shut off feature when wind speeds reach 100 miles per hour. The shut off systems are automatically controlled and deployed and employ a weather vane and either a solenoid or manual controls.

At the higher 50-100 mile per hour wind speeds, the invention will produce electrical energy, but at a lower rate than when operating in the normal 0-50 mile per hour wind speeds. Thus, the invention is able to operate in low to medium to high wind conditions by switching the device from normal wind operation to medium wind speed operation to safe zone high wind speed operation.

The device may also be provided with deicing capability.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from FIG. 2a;

FIG. 2c is a sectional view taken along line 2c-2c of FIG. 2a;

FIG. 5b is a sectional view taken along line 5b-5b of FIG. 5a;

DETAILED DESCRIPTION OF THE PREFERRED EMBODIMENT

Figure 1:
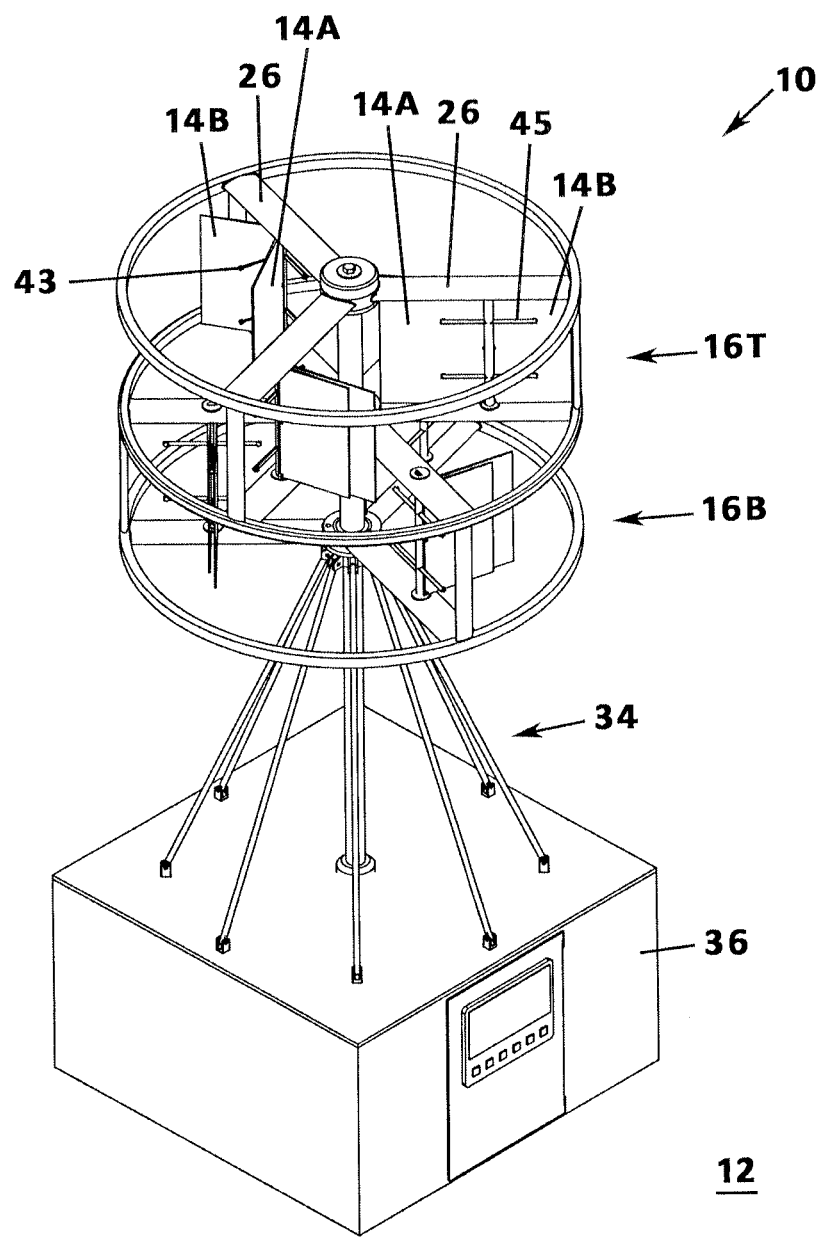
FIG. 1 is a perspective view of a wind turbine in accordance with a preferred embodiment of the present invention.

A wind turbine according to a preferred embodiment of the present invention will now be described with reference to FIGS. 1 to 8 of the accompanying drawings. The wind turbine 10 includes a plurality of blade assemblies 14 coupled to and configured to rotate a drive shaft 18 so as to operate an electrical generator 38. Although the wind turbine 10 can be mounted in various ways, for purposes of illustration, the wind turbine 10 will be shown in the drawings as mounted on the ground 12.

Figure 2A:
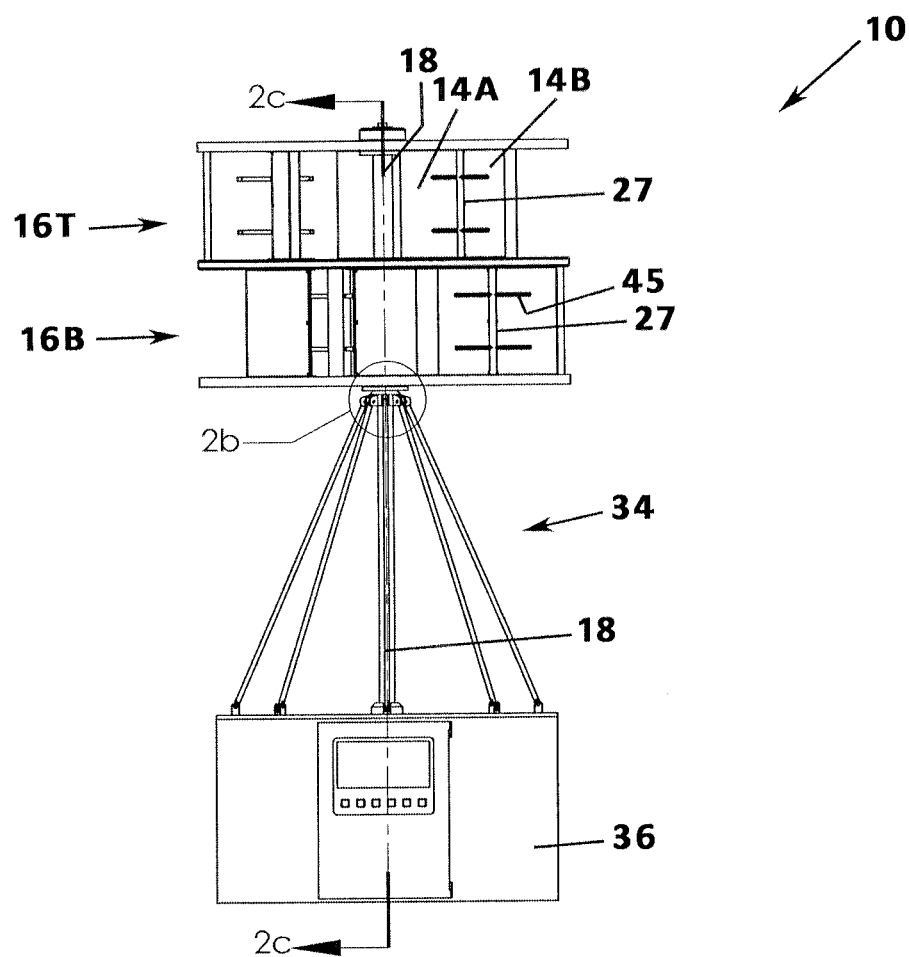
FIG. 2a is a front view of the wind turbine as in FIG. 1.
Figure 2B:
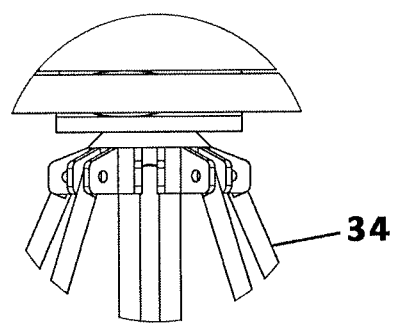

Referring also to FIG. 2, the wind turbine 10 consists of six sets 14 of two blades 14A and 14B per each set 14 and the blades 14A and 14B are vertically mounted in a tier of two stacks or carousels 16T (a top carousel) and 16B (a bottom carousel) that attach to a central rotating drive shaft 18. The carousels may be defined and constructed of spaced apart rings that define open spaces. The top stack 16T consists of three sets 14 of two blades 14A and 14B per each set 14, and the bottom carousel 16B consists of three sets 14 of two blades 14A and 14B per each set 14. Blade 14A is referred to as the inner or innermost blade and blade 14B is referred to as the outer or outermost blade. The three sets of blades in the top carousel 16T may also be referred to as a first top blade assembly, a second top blade assembly, and a third top blade assembly, and the three sets of blades in the bottom carousel 16B may be referred to as a first bottom blade assembly, a second bottom blade assembly, and a third bottom blade assembly. However, each blade assembly has the same or substantially the same construction and so the same reference numerals are used for each one.

The sets 14 of blades 14A and 14B in the top carousel 16T are spaced apart at 120 degrees from each other, and the sets 14 of blades 14A and 14B in the bottom carousel 16B are spaced apart at 120 degrees from each other. The angles of separation are best understood with regard to the degree of rotation about the drive shaft 18. Further, the sets 14 of blades 14A and 14B in the top carousel 16T are offset vertically from the sets 14 of blades 14A and 14B in the bottom carousel 16B by 60 degrees. In other words, the sets of blades may be offset so that there is always at least one set fully unfolded into wind coming from any direction.

Figure 2C:
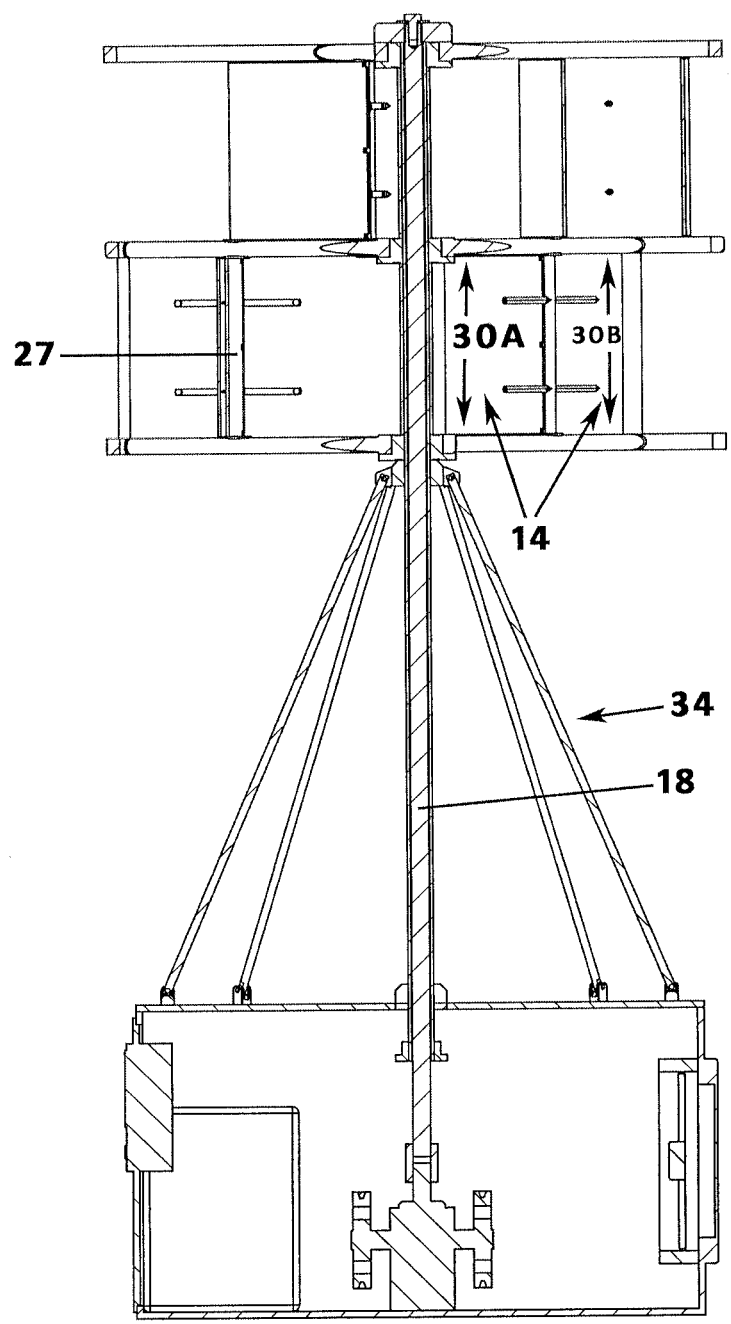
Figure 3:
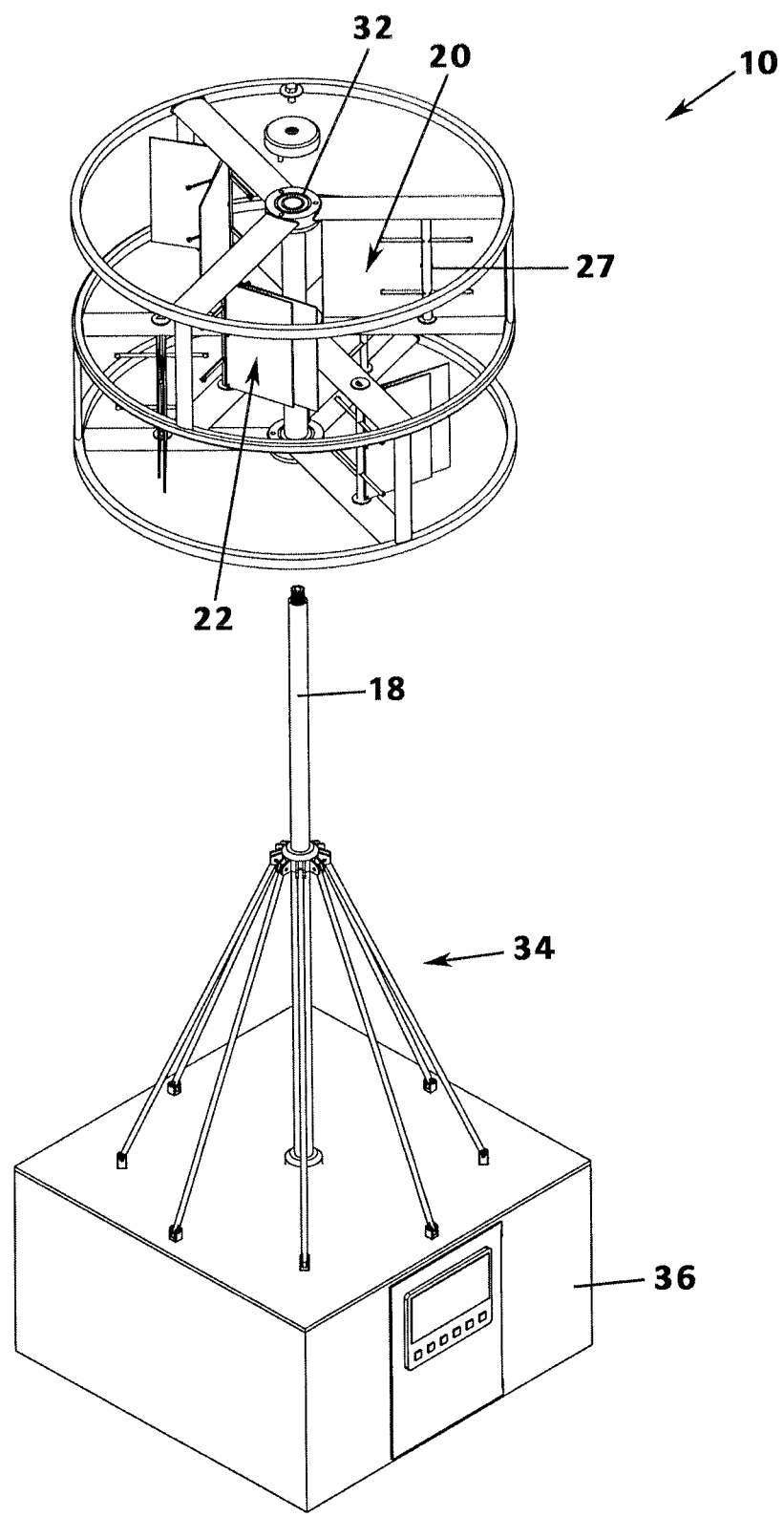
FIG. 3 is an exploded view of the wind turbine as in FIG. 1.
Figure 4:
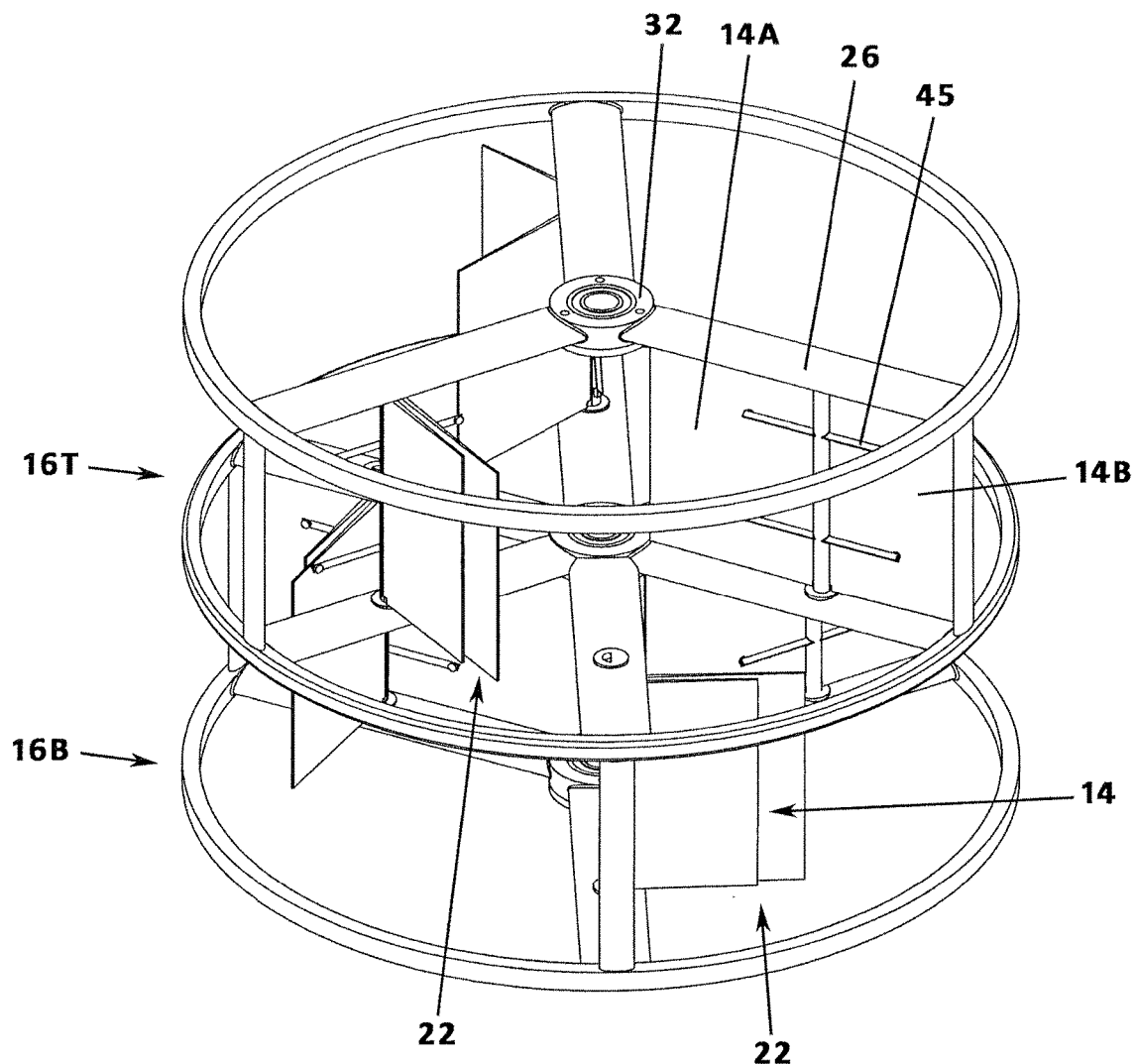
FIG. 4 is a perspective view of the double carousel removed from the wind turbine as in FIG. 1.

As illustrated in FIGS. 2c and 4, the two blades 14A and 14B of each set 14 are pivotally mounted to a vertical support shaft 27 that extends vertically between the two blades of a set 14 so that they are capable of moving from a fully open configuration 20 where the two blades 14A and 14B are located in a single vertical plane 21 to a fully closed configuration 22 where the two blades 14A and 14B are located in two parallel vertical planes, 23A and 23B respectively, that are 90 degrees displaced from the single vertical plane 21 of the fully open configuration 20. Each set 14 of blades 14A and 14B is moved between open and closed positions 20 and 22 by a bell crank (not illustrated) that is actuated by the blades 14A and 14B in response to the wind direction 24 and the wind's force on the blades 14A and 14B. In order for the blades 14A and 14B in each set 14 to pivot toward each other, they are pivotally mounted to a vertical support shaft 27 that extends vertically between the two blades 14A and 14B of each set 14. Then, each support shaft 27 is coupled to framework 26 that attaches to the drive shaft 18. As the wind "pushes" against an open blade set 14, the framework 26 rotates the drive shaft 18 to generate electricity as will be described later.

The widths 28A and 28B of the blades 14A and 14B are variable, but the width 28A of the innermost blade 14A of the two blades 14A and 14B in each set 14 is wider by approximately 20% than the width 28B of its associated outermost or outboard blade 14B. The vertical heights 30A and 30B of the blades 14A and 14B can vary, but the vertical heights 30A and 30B of each set 14 will be the same height. Also, the blades 14A and 14B of all three of the sets 14 on a given level or horizontal carousel 16T or 16B of the turbine 10 will be of the same vertical heights 30A and 30B.

The drive shaft 18 is mounted in bearings 32 that are supported by a tower 34 and a supporting ground housing 36 so that the vertical drive shaft 18 is able to rotate freely by movement of respective framework 26. In other words, the drive shaft 18 is rotated by the force of wind on the blades 14A and 14B, and rotation of the drive shaft 18 powers a generator 38 located within the housing 36 to produce electricity. The generator 38 is located at ground level 12 so that the majority of maintenance for the turbine 10 is at ground level.

Figure 5A:
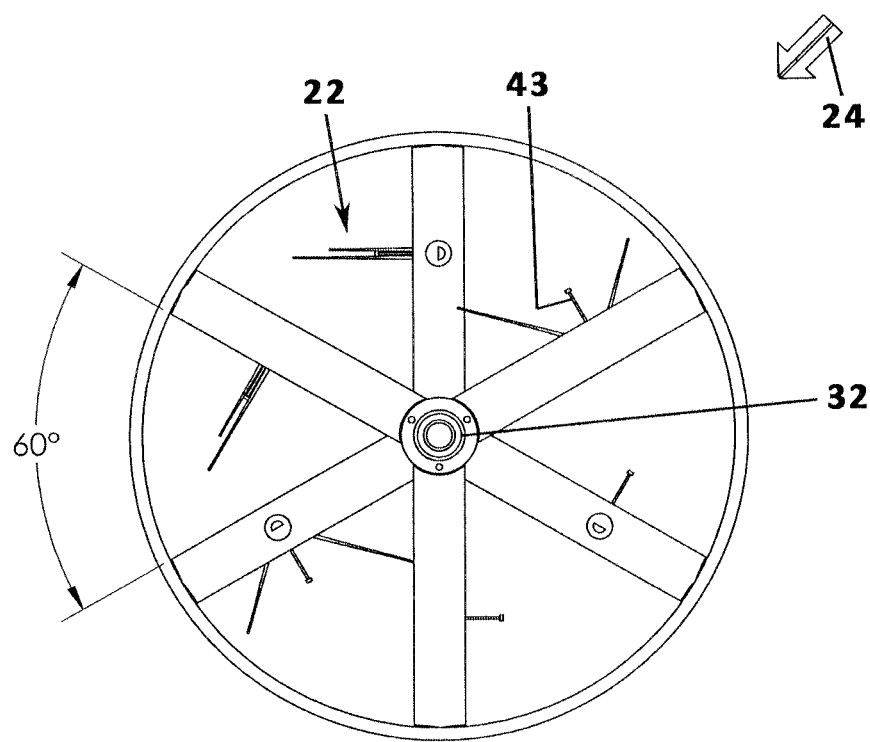
FIG. 5a is a top view of the wind turbine as in FIG. 1.
Figure 5B:
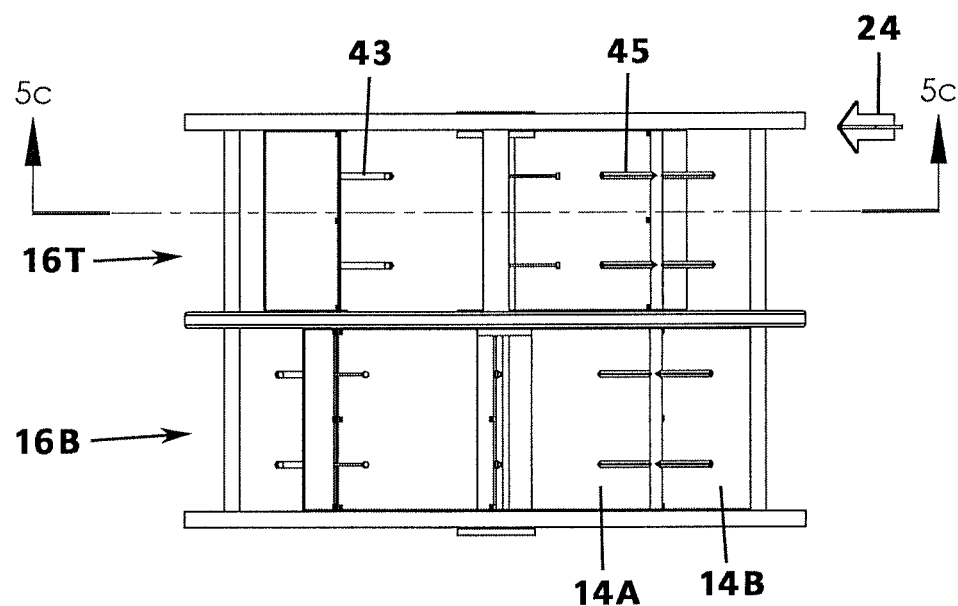
Figure 5C:
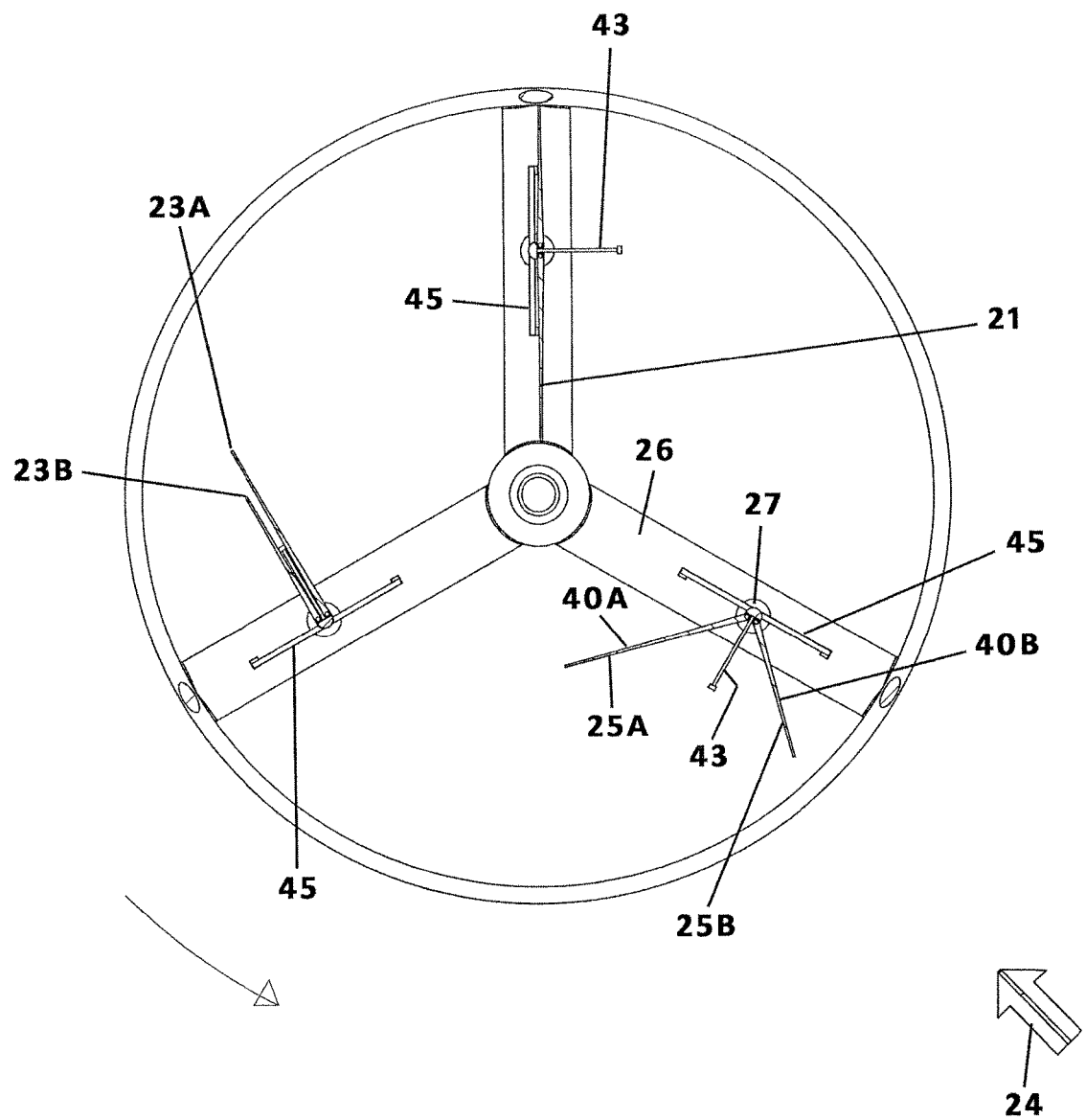
FIG. 5c is a diagrammatic view of the wind turbine operation.
Figure 6A:
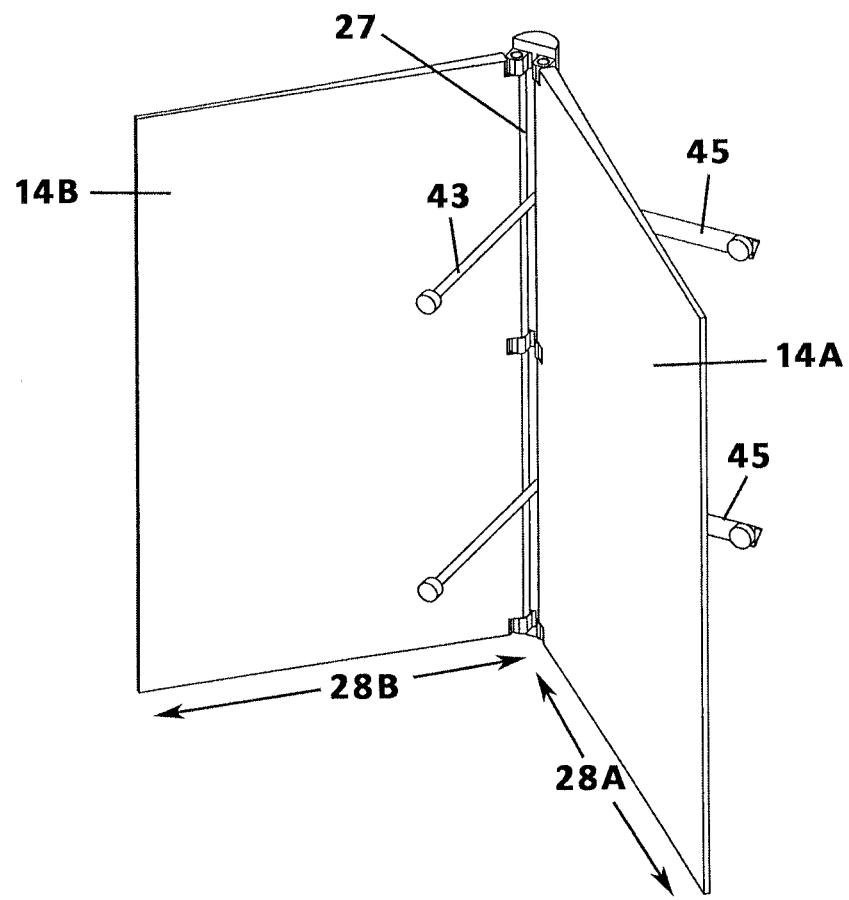
FIG. 6a is a perspective view of a pair of blades and first and second shock absorbers removed from the carousel of FIG. 4.

As illustrated in FIG. 5c, the unique thing about the turbine 10 is that the two blades 14A and 14B of each set 14 alternately open and close independently of the other sets 14 in response to the relative location of the blades 14A and 14B with respect to the wind direction 24 as the blades 14A and 14B rotate with the vertical drive shaft 18. The wind provides the force to open and close the sets 14 of blades 14A and 14B.

Figure 7A:
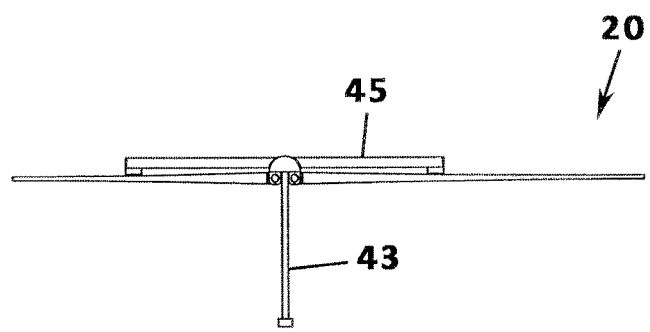
FIG. 7a is a top view of the pair of blades of FIG. 6a illustrated to show the blades in a fully open configuration.
Figure 7B:
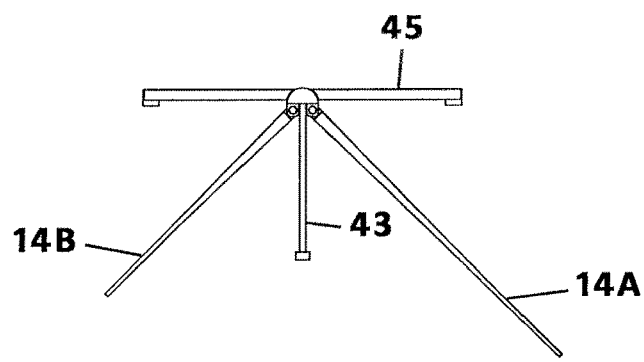
FIG. 7b is a top view of the pair of blades of FIG. 6a illustrated to show the blades in a partially open configuration.
Figure 7C:
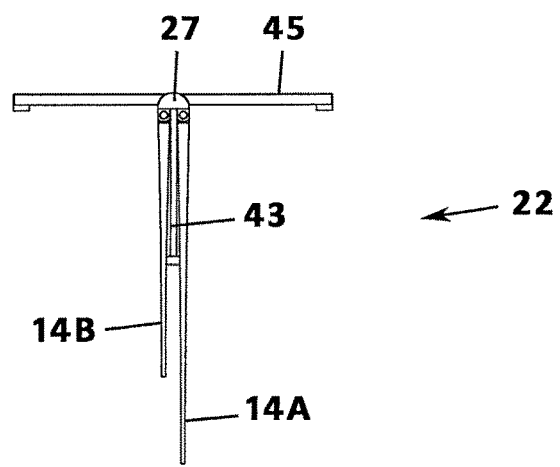
FIG. 7c is a top view of the pair of blades of FIG. 6a illustrated to show the blades in a fully closed configuration.
Figure 8:
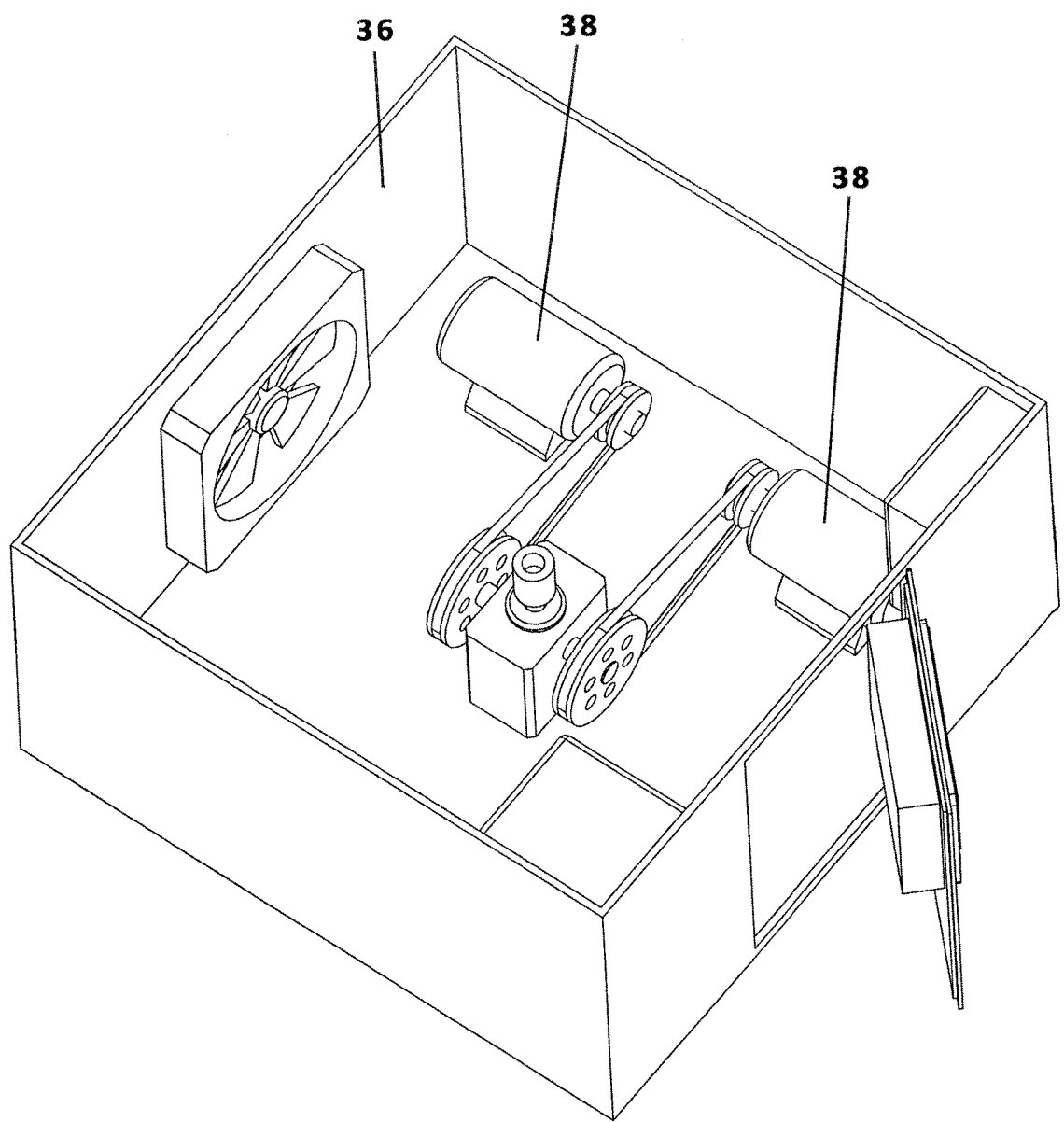
FIG. 8 is a perspective view of a housing and electrical generator according to the present invention.

As best shown in FIGS. 7a to 7c, each set 14 of two blades 14A (inner) and 14B (outer) moves to its open position 20 so that the blades 14A and 14B lie in a single plane 21 that is perpendicular to the wind direction 24 as that set 14 rotates in the direction opposite the wind direction 24. In this open position 20, the wind exerts force on front sides 25A, 25B of blades 14A and 14B causing them to be rotated away from the wind direction 24. Rotation of the blades 14A and 14B also rotates the drive shaft 18 to which they are attached via framework 26.

As each set 14 of two blades 14A and 14B rotates so that the wind direction 24 is against the back sides 40A and 40B of the blades 14A and 14B as the blades 14A and 14B rotate in the direction of the wind 24, the wind causes the blades 14A and 14B to close or pivot toward each other. When the blades are in their fully closed position 22, the blades 14A and 14B lie in parallel planes 23A and 23B relative to each other and those parallel planes 23A and 23B are also parallel with the wind direction 24. In this closed position 22, the wind does not exert any significant force on the blades 14A and 14B.

Because the wind exerts considerable force on the blades 14A and 14B as the blades 14A and 14B rotate away from the wind direction 24 and exerts very little force on the blades 14A and 14B as they rotate toward the wind direction 24, the net result is that the wind rotates the blades 14A and 14B and the attached drive shaft 18 to generate electricity regardless of the wind direction 24.

The turbine 10 is provided with an air pressure tube technology system 42 that is a shock absorbing system that dampens the shock as the sets 14 of blades 14A and 14B open and close as the carousels 16T and 16B rotate in conjunction with the drive shaft 18. More particularly, a first shock damper 43 is positioned rearward of the first top blade assembly and includes a linear configuration that is parallel to the first top blade assembly when the inner blade 14A and the outer blade 14B are at the fully open configuration and configured to absorb an impact force of the inner blade and the outer blade unfolding (FIG. 5c). In addition, the first shock damper prevents the first top blade assembly from opening wider than the fully open configuration.

Further, the shock absorbing system 42 includes a second shock damper 45 (FIG. 5c) positioned frontward of the first top blade assembly and having a linear configuration that is sandwiched between the inner blade 14A and the outer blade 14B at the fully closed configuration and configured to absorb an impact force of the inner blade and the outer blade folding together.

The turbine 10 is designed to normally operate at wind speeds of up to 50 miles per hour. The turbine 10 has an automatic self-protection feature that shuts the device off at wind speeds of fifty miles per hour. This first shut off feature can be overridden by the operator, and the invention will automatically shut off via a second shut off feature when wind speeds of seventy five miles per hour are reached. This second shut off feature can also be overridden by the operator, and the turbine 10 will then automatically shut off via a third shut off feature when wind speeds reach one hundred miles per hour. The shut off systems are automatically controlled and deployed and employ a weather vane and either a solenoid or manual controls (not illustrated).

At the higher fifty to one hundred mile per hour wind speeds, the turbine 10 will produce electrical energy, but at a lower rate than when operating in the normal under fifty mile per hour wind speeds. Thus, the turbine 10 is able to operate in low to medium to high wind conditions by switching the turbine 10 from normal wind operation to medium wind speed operation to safe zone high wind speed operation.

The turbine 10 is also provided with deicing capability (not illustrated) so that it can operate in almost all weather conditions except when wind speeds are in excess of one hundred miles per hour.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited by the scope of the attached claim or claims, including the full range of equivalency to which each element thereof is entitled.

It is understood that while certain forms of this invention have been illustrated and described, it is not limited thereto except insofar as such limitations are included in the following claims and allowable functional equivalents thereof.

The invention claimed is:

1. A wind turbine having a framework extending upwardly from a ground surface, comprising:
    a top carousel;
    a generator located adjacent the ground surface and capable of producing electricity when actuated;
    a drive shaft rotatably coupled to said generator and extending upwardly therefrom and into said top carousel; and
    a first top blade assembly for receiving an air stream, said first top blade assembly being operatively coupled to said drive shaft and positioned within said top carousel such that said first top blade assembly, when pushed by an air stream, causes said drive shaft to rotate;
    wherein said first top blade assembly includes a first top outer blade pivotally coupled to a first top support shaft and a first top inner blade pivotally coupled to said first top support shaft, said first top blade assembly being pivotally movable about said first top support shaft between a fully open configuration at which said first top inner blade and said first top outer blade are in a unitary vertical plane and a fully closed configuration at which said first top inner blade and said first top outer blade are in parallel vertical planes;

a second top blade assembly for receiving an air stream, said second top blade assembly being operatively coupled to said drive shaft within said top carousel such that said second top blade assembly, when pushed by an air stream, causes said drive shaft to rotate;

wherein said second top blade assembly includes a second top outer blade pivotally coupled to said second top support shaft and a second top inner blade pivotally coupled to said second top support shaft, said second top blade assembly being pivotally movable about said second top support shaft between a fully open configuration at which said second top inner blade and said second top outer blade are in a unitary vertical plane and a fully closed configuration at which said second top inner blade and said second top outer blade are in parallel vertical planes;

a first shock damper positioned rearward of said first top blade assembly and having a linear configuration that is parallel to said first top blade assembly when said inner blade and said outer blade are at said fully open configuration and configured to absorb an impact force of said inner blade and said outer blade unfolding, said first shock damper preventing said first top blade assembly from opening wider than said fully open configuration;

a second shock damper positioned frontward of said first top blade assembly and having a linear configuration that is sandwiched between said inner blade and said outer blade at said fully closed configuration and configured to absorb an impact force of said inner blade and said outer blade folding together;

a third top blade assembly for receiving an air stream, said third top blade assembly being operatively coupled to said drive shaft within said top carousel such that said third top blade assembly, when pushed by an air stream, causes said drive shaft to rotate;

wherein said third top blade assembly includes a third top outer blade pivotally coupled to a third top support shaft and a third top inner blade pivotally coupled to said third top support shaft, said third top blade assembly being pivotally movable about said third top support shaft between a fully open configuration at which said third top inner blade and said third top outer blade are in a unitary vertical plane and a fully closed configuration at which said third top inner blade and said third top outer blade are in parallel vertical planes;

wherein said third top blade assembly is spaced apart from said second top blade assembly by about 120 degrees of rotation;

a self-protection module having a weather vane operable to determine wind speed and a solenoid operably coupled to at least said top carousel, said self-protection module being operable to actuate said solenoid to stop said at least said top carousel from rotating.

2. The wind turbine as in claim 1, wherein said first top inner blade has a length that is about 20% longer than a length of said first top outer blade.

3. The wind turbine as in claim 1, wherein:
said first top blade assembly and said second top blade assembly are positioned in said top carousel; and
said first top blade assembly is spaced apart from said second top blade assembly by about 120 degrees of rotation.

4. The wind turbine as in claim 1, further comprising:
a bottom carousel coupled to said top carousel, said drive shaft extending through said bottom carousel and into said top carousel;
a first bottom blade assembly for receiving an air stream, said first bottom blade assembly being operatively coupled to said drive shaft and positioned within said bottom carousel such that said first bottom blade assembly, when pushed by an air stream, causes said drive shaft to rotate;
wherein said first bottom blade assembly includes a first bottom outer blade pivotally coupled to a first bottom support shaft and a first bottom inner blade pivotally coupled to said first bottom support shaft, said first bottom blade assembly being pivotally movable about said first bottom support shaft between a fully open configuration at which said first bottom inner blade and said first bottom outer blade are in a unitary vertical plane and a fully closed configuration at which said first bottom inner blade and said first bottom outer blade are in parallel vertical planes.

5. The wind turbine as in claim 4, further comprising:
a second bottom blade assembly for receiving an air stream, said second bottom blade assembly being operatively coupled to said drive shaft within said bottom carousel such that said second bottom blade assembly, when pushed by an air stream, causes said drive shaft to rotate;
wherein said second bottom blade assembly includes a second bottom outer blade pivotally coupled to a second bottom support shaft and a second bottom inner blade pivotally coupled to said second bottom support shaft, said second bottom blade assembly being pivotally movable about said second bottom support shaft between a fully open configuration at which said second bottom inner blade and said second bottom outer blade are in a unitary vertical plane and a fully closed configuration at which said second bottom inner blade and said second bottom outer blade are in parallel vertical planes.

6. The wind turbine as in claim 5, wherein said first top blade assembly is offset from said first bottom blade assembly by about 60 degrees of rotation.

7. The wind turbine of claim 1, wherein said unitary vertical plane associated with said fully open configuration and said parallel vertical planes associated with said fully closed configuration are offset from one another by 90 degrees.

8. The wind turbine of claim 1, wherein said drive shaft includes bearings so as to rotate freely when said first top blade assembly is pushed by a wind stream.

9. The wind turbine of claim 1, further comprising a housing and said generator is positioned inside said housing, said generator producing electricity when said drive shaft is rotated.

10. A wind turbine, comprising:
a top carousel defining an interior area;
a generator capable of producing electricity;
a drive shaft rotatably coupled to said generator and extending upwardly therefrom and into said interior area of said top carousel; and a plurality of top blade assemblies positioned within said top carousel and operatively coupled to said drive shaft, each top blade assembly configured for receiving an air stream, such that said plurality of top blade assemblies, when pushed by an air stream, causes said drive shaft to rotate in said generator;

wherein each top blade assembly includes a pair of blades coupled to a support shaft and pivotally movable by the air stream between a fully open configuration at which said pair of blades are situated in a unitary vertical plane and a fully closed configuration at which said pair of blades are situated in parallel vertical planes relative to said support shaft further comprising a self-protection module having a weather vane operable to determine wind speed and a solenoid operably coupled to at least said top carousel, said self-protection module being operable to actuate said solenoid to stop said at least said top carousel from rotating.

11. The wind turbine as in claim 10, further comprising:

a bottom carousel coupled to said top carousel, said drive shaft extending through said bottom carousel and into said top carousel;

a plurality of bottom blade assemblies positioned within said bottom carousel and operatively coupled to said drive shaft, each bottom blade assembly configured for receiving an air stream, such that said plurality of bottom blade assemblies, when pushed by an air stream, causes said drive shaft to rotate in said generator;

wherein each bottom blade assembly includes a pair of blades coupled to a support shaft and pivotally movable by the air stream between a fully open configuration at which said pair of blades are situated in a unitary vertical plane and a fully closed configuration at which said pair of blades are situated in parallel vertical planes relative to said support shaft.

12. The wind turbine as in claim 10, wherein each top blade assembly is spaced apart from an adjacent top blade assembly by about 120 degrees of rotation relative to said drive shaft.

13. The wind turbine as in claim 11, wherein each bottom blade assembly is spaced apart from an adjacent bottom blade assembly by about 120 degrees of rotation relative to said drive shaft.

14. The wind turbine as in claim 11, wherein each top blade assembly is offset from a corresponding bottom blade assembly by about 60 degrees of rotation, respectively.

15. The wind turbine as in claim 10, further comprising:

a first shock damper positioned rearward of a respective top blade assembly and having a linear configuration that is parallel to said respective top blade assembly when said pair of blades thereof are at said fully open configuration and for absorbing an impact force caused by said pair of blades unfolding, said first shock damper preventing said respective top blade assembly from opening wider than said fully open configuration; and a second shock damper positioned frontward of said respective top blade assembly and having a linear configuration that is sandwiched between said pair of blades thereof at said fully closed configuration and configured to absorb an impact force of said pair of blades thereof folding together.

16. The wind turbine as in claim 10, wherein said drive shaft is operable to rotate at low, medium, and high speeds in an inverse relationship to predetermined low, medium, and high ambient wind conditions, respectively.

* * * * *